United States Patent [19]
Hodges

[11] 3,998,186
[45] Dec. 21, 1976

[54] METHOD AND APPARATUS FOR CONTROLLED-ENVIRONMENT SHRIMP CULTURE

[75] Inventor: Carl N. Hodges, Tucson, Ariz.
[73] Assignee: Resorts International, Inc., North Miami, Fla.
[22] Filed: Jan. 15, 1975
[21] Appl. No.: 541,249

[52] U.S. Cl. ................................................ 119/2
[51] Int. Cl.² ...................................... A01K 61/00
[58] Field of Search ............................ 119/2, 3, 4

[56] References Cited
UNITED STATES PATENTS

| | | | |
|---|---|---|---|
| 3,473,509 | 10/1969 | Miyamura | 119/2 |
| 3,477,406 | 11/1969 | Fujinaga | 119/2 |
| 3,709,195 | 1/1973 | Tabb | 119/2 |
| 3,735,736 | 5/1973 | Yee et al. | 119/2 |

Primary Examiner—Hugh R. Chamblee

[57] ABSTRACT

Shrimp hatched and brought through larval and post-larval stages are introduced into and held for growth to adulthood in a controlled-environment unit which includes plastic cover means positioned over an elongated waterway containing seawater, or the like, and algae in substantial amounts. The design of the unit and the technique of intermittently supplying seawater allows the control of light intensity and light spectral characteristics within the shrimp growing area and the control of seawater flow rate, temperature and dissolved oxygen content of the seawater in the waterway.

8 Claims, 5 Drawing Figures

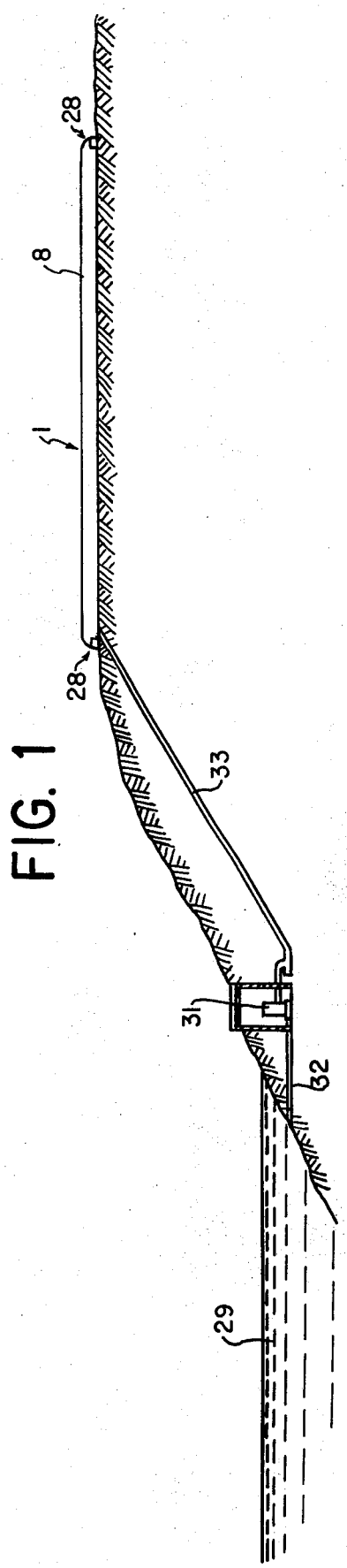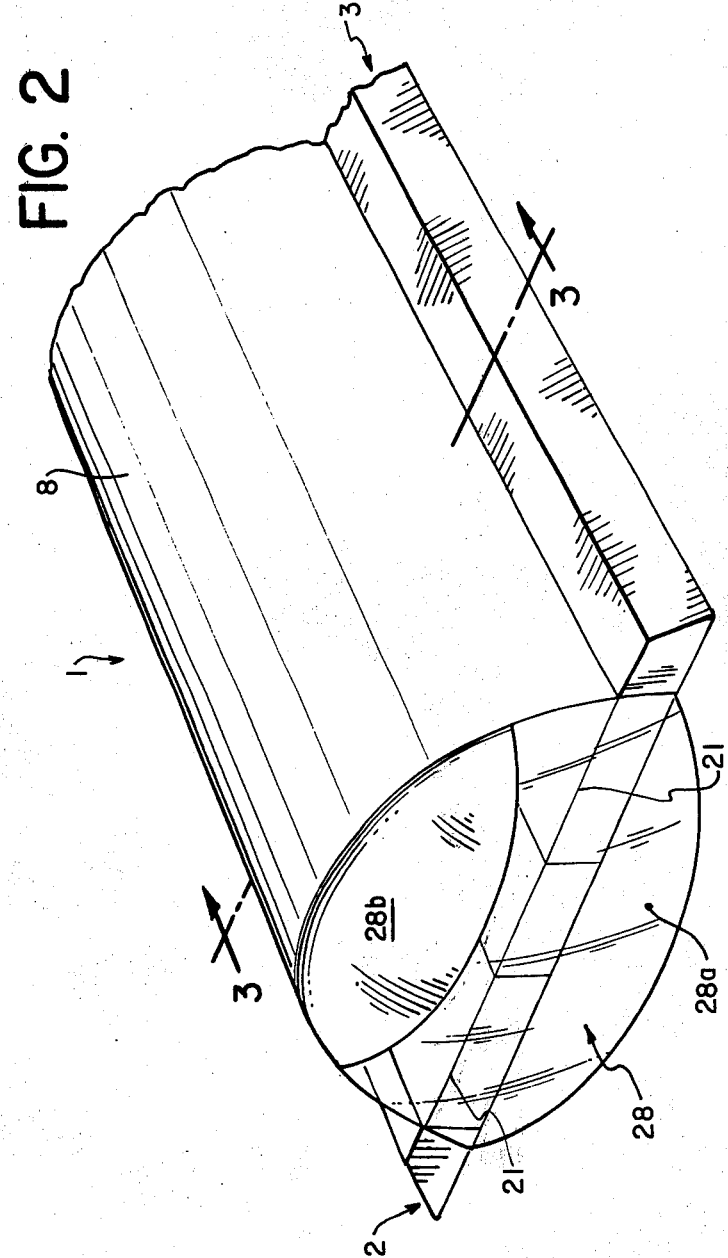

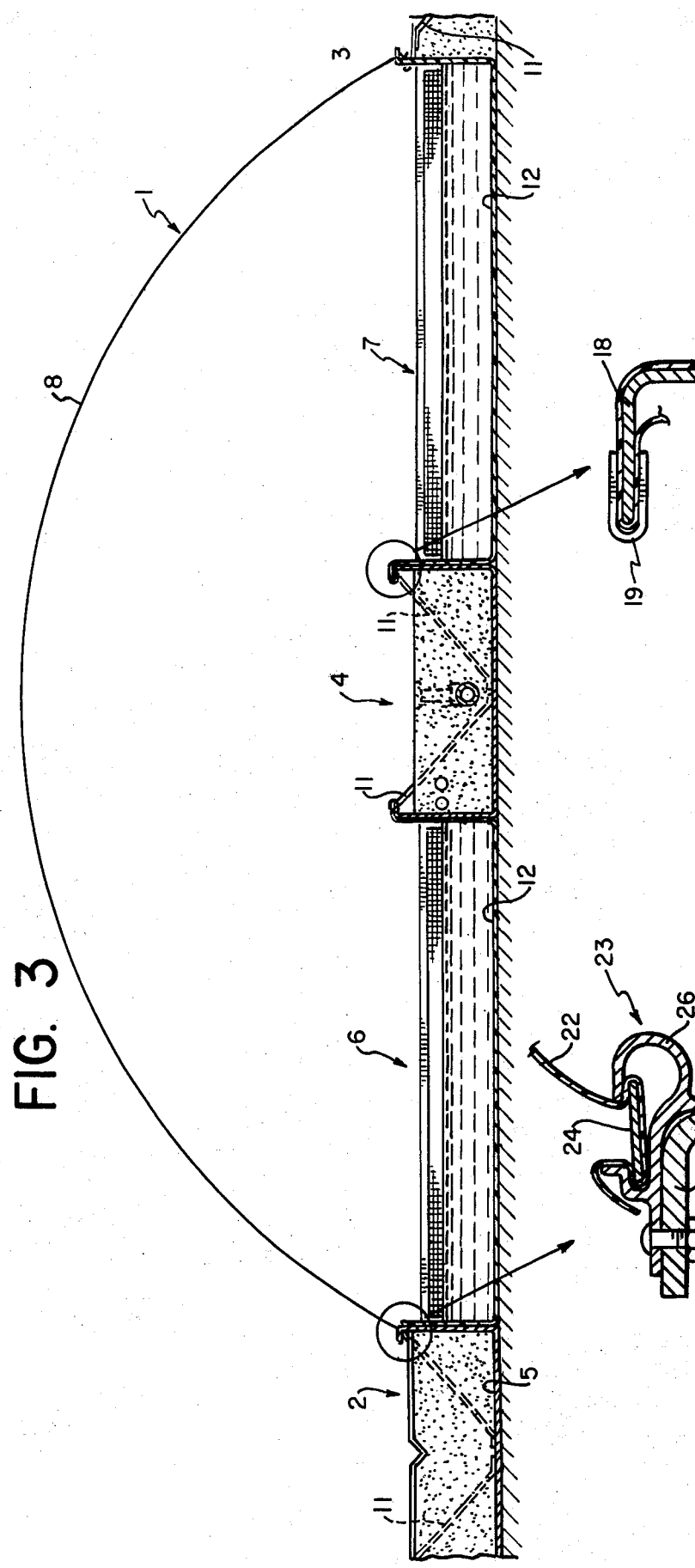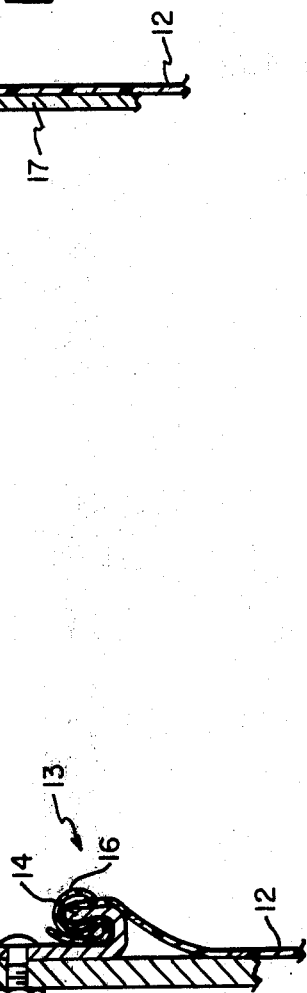

METHOD AND APPARATUS FOR CONTROLLED-ENVIRONMENT SHRIMP CULTURE

BACKGROUND OF THE INVENTION

Numerous proposals have been made for raising shrimp in captive facilities. Shrimp-stocked ponds have been used; however, conditions within the ponds have varied over substantial ranges thus preventing the obtaining of consistent harvests of marketable shrimp using reasonable quatities of food rations. Other efforts to raise shrimp in controlled environments have also met with limited success.

Flexible material dome-like enclosures have been previously used as environmental control areas for growing plants. Inflated and frame greenhouses have been successfully used for plant growth in certain areas of world where conditions such as light intensity, required temperatures, internal atmospheres and proper nourishment are readily able to be utilized.

SUMMARY OF THE INVENTION

Broadly, the present invention is a method and apparatus for raising Penaeid shrimp in a controlled environment comprising introducing shrimp into an elongated waterway defined by substantially impervious bottom and side walls which contain a body of seawater essentially stationary during daylight hours and slowly moving or flowing during some or all of the nighttime hours, maintaining a quantity of suitable species of algae growing within the waterway, providing a light-screening dome supported over and enclosing the waterway, maintaining levels of dissolved oxygen within the seawater and controlling the temperature of the seawater whereby substantial growth of the shrimp is accomplished.

It is a feature of the process that natural solar radiation through the light screening cover dome is varied to manipulate the amount of oxygen photosynthesized by the algae cultured on the sides and bottom of the waterway.

It is also a feature of the process that water temperature is controlled by radiational heating and evaporative cooling within the structure to provide optimum conditions for the animals.

BRIEF DESCRIPTION OF THE DRAWINGS

FIG. 1 is a sectional elevational view showing a portion of a body of water in which shrimp naturally reside and a shrimp environmental enclosure unit of this invention positioned on nearby land;

FIG. 2 is a fragmented enlarged perspective view of one end of the shrimp environmental enclosure unit;

FIG. 3 is a sectional view taken along line 3–3 of FIG. 2;

FIG. 4 is an enlarged view of a portion of FIG. 3 as indicated; and

FIG. 5 is an enlarged view of a portion of FIG. 3 as indicated.

DETAILED DESCRIPTION OF A PREFERRED EMBODIMENT

Referring to the figures, shrimp environmental enclosure unit 1 includes parallel side foundation members 2 and 3, a center walkway foundation 4 and the support floor 5 which form the basic foundation support for shrimp waterways 6 and 7 and serve as an anchor for air-supported dome 8. Foundation members 2 and 3 are constructed of poured concrete with reinforcing rods 11 used to increase strength.

Each shrimp waterway, 6 and 7, includes rectangular flexible plastic liner 12 which is supported along its longitudinal edges remote from the center walkway 4 by a plurality of spaced-apart clip arrangements 13 (FIG. 4) which are bolted to upright metal framing pieces 9 attached to foundation members 2 and 3. Each clip arrangement has a hooked portion 14 and an expandable C-shaped element 16 which fits over and functions to hold the liner against the hook portion. The support arrangement for the edges of the liners 12 adjacent the center walkway 4 is shown in FIG. 5. The uprights 17 with L-shaped upper portions 18 support the inside liner edge portions using clamps 19 which seize and hold the edge portion against the portions 18. Uprights 17 are positioned at spaced intervals along walkway 4 to provide adequate support.

The ends of the waterway liners 12 are suitably supported on water end elements 21 to complete the water holding capability of the waterway. While the liner holding means described are particularly useful in that they do not require puncturing the liner and permit easy detachment other suitable means may be used. As supported, each liner 12 forms a rectangular waterway approximately 200 feet long, 20 feet wide and 2 feet deep.

A quantity of natural or artificial seawater or a mixture of the two is introduced by spraying or other means into the right hand end of each waterway (viewed in FIG. 2), which water flows from right to left as indicated by the arrows and from time to time quanties are drained from the left hand end of each waterway. Of course, other flow patterns can be used. The water is initially innoculated with algae. Conditions are maintained in the environmental unit so that the algae grow on the bottom, sides and in the water of the waterways 6 and 7. The algae usually forms a thin mat on the wall and sides of the waterway. The water within the waterway remains stationary or nearly so during daylight hours when oxygen is being produced photosynthetically by algae. Dissolved oxygen content of the water may reach about 20 parts per million. During nighttime hours, when oxygen is no longer being produced by the algae and is being consumed by a via plant and animal respiration, a flow of new seawater is introduced in order to flush the system of accumulated metabolites and other debris and to increase the level of oxygen. Water with substantial levels of dissolved oxygen should be fed in before the dissolved oxygen content drops below 5 or 6 ppm, to thereby maintain dissolved oxygen levels between about 5 and about 20 ppm. The shrimp experience a daily change in dissolved oxygen contents in the practice of my method. The rate of flow may be varied as required with the water being changed as little as once or as many as 1 to 20 times each (24) period.

Water used should have salinity, pH and other characteristic similar to seawater. Water pH is preferably between 7 and 9. The temperature may range widely depending on the latitude of enclosure unit. At a latitude of 30° in the Northern Hemisphere a range of 20°–30° C has been found satisfactory.

The enclosure dome 8 is preferably made of a light plastic sheeting material sold as Monsanto 602 polyethylene film. The sheeting is secured along its edges and supported by air pressure supplied by a conventional pump and interlock system to permit access by workers to the walkway. The pump and interlock means is not shown in the drawings. While air pressure is the preferable means of supporting the dome, it may be supported by frame means or a combination of air and frame means.

The side portions of the dome sheet 22 are held by loop and plate arrangements 23. As the air pressure raises dome 8, sheet 22 pulls plate 24 to force it against loop 26 thus holding the sheet in place. This arrangement permits ready detachment and replacement of the sheet as required. Other suitable sheet holding means may also be used.

Dome 8 has end portions which are also tethered by suitable hold-down means. Dome end portions 28 may have two panels, 28a, and 28b, or may be of the same material and the same individual piece of material as the main dome section 8. The main dome section and one or more of the end panels are comprised of substantially translucent or transparent plastic film which, varying with the latitude and season, may be of a single layer or may be of two or more layers with additional insulating materials interspersed. Additionally, during high-radiation summer months, secondary shading may be provided by opaque plastic film drawn over portions of the dome. By controlling the extent and the amount of solar radiation transmitted through the dome material, light intensity and light spectral characteristics are adjusted to provide optimum water quality characteristics for algal oxygen production and shrimp growth. By selecting the types of plastic materials used for the main dome cover or to supplement the main dome cover, nighttime temperature drops of the seawater in the enclosed raceway due to radiation to the night sky, particularly in winter months, may be greatly reduced. The number and position of translucent and non-translucent panels, and the number and position of insulated or non-insulated panels, may be varied to accomplish desired levels of transmission of visible and non-visible radiant energy into and out of the controlled-environment structure.

Turning to FIG. 1, the shrimp environmental unit 1 is shown being served with water taken from a body of water 29 where shrimps naturally reside. Pump 31 pulls water through suction pipe 32 and discharges the water through pipe 33 for use in the waterways of the unit. As the water temperature of body of water 29 increases and decreases for seasonal reasons and due to other natural causes, the temperature of the water as introduced to the waterway is also increased or decreased. Water may be taken directly from the body of water in which shrimp reside or may be taken from well or ground water nearby; which well or ground water will also exhibit, although with dampened effect, the water temperature changes experienced by the shrimp in their natural habitat. Saltwater intended for introduction into the enclosed waterway during nighttime hours may be pumped up into a reservoir during daytime hours and be heated by solar radiation and have the level of dissolved oxygen within the stored water elevated by algal photosyntheses. Alternatively, artificial heating or cooling of the pumped water or of the stored water prior to its introduction to the enclosed waterway may be employed. In addition, at any time, but particularly during nighttime hours, water impounded within the waterway may be recirculated without replenishment by new or makeup water, during such recirculation passing through biological or chemical or mechanical filtering systems and being sprayed back into the waterway. Such latter techniques permit the maintenance of the achieved temperature within the enclosed water while removing waste materials and restoring dissolved oxygen via aeration. At one or more times during each (24) hour period, the enclosed water is largely flushed from the waterway by rapid draining to a depth of a few inches; pumped or stored water new to the system is then introduced into the waterway as quickly as circumstances permit. As the temperature of the air in the enclosure unit affects the temperature of the water, air heating and cooling may be used to additionally manipulate water temperature via heat transfer effect. As the amount of dissolved oxygen in the water may be reduced by diffusion through the air-water interface, the air within the controlled-environment dome or structure may have its oxygen content elevated by other known means as well as having temperature and airflow characteristics regulated and controlled.

Controlled levels of solar radiation reach the shrimp in the waterway, as well as controlled levels of water temperature, dissolved oxygen and water quality. The enclosed shrimp may therefore experience such environmental changes correlative to changes experienced in their natural habitat, when such correlation is desirable, as in maturation and reproductive life-cycle modes; or the enclosed shrimp may experience higher temperatures and higher levels of dissolved oxygen when such alterations are known to accelerate animal metabolism, growth rates, and the effective conversion of feeds to animal tissue.

The level of dissolved oxygen within the seawater in the waterway, critical to the health and well-being of the shrimp, is controlled by modulating the photosynthetic production of oxygen by algae species cultured within the waterway via control of the radiation incident upon the water, the degree of aeration obtained from airstream or airflow manipulations in the unit, agitation of the water or other means for introducing air or oxygen into the waterway or by adding and withdrawing water to the waterway.

It has been found that the use of smaller tanks for spawning, larvae development and postlarvae growth in conjunction with the environmental enclosure units, as herein described, permits the hatching and raising of a large number of marketable shrimp.

In the practice of the present method of shrimp culture, shrimp are hatched and grown through postlarval stages before placement in the controlled-environment waterway. Gravid female shrimp are held in 40 liter spawning containers at a water temperature of approximately 28° C to experience effective spawning. Eggs from one female, in scores or hundreds of thousands, are transferred immediately to 2,000 liter hatch tanks where they hatch into larvae and are held for approximately 12 days and fed two species of cultured single-celled algae as they pass through the various stages of larval growout. As the shrimp become postlarval animals, they are held in similar tanks (± 2,000 liters) for 30 to 60 days and fed cultured artemia (brine shrimp) and cultured algae as they pass through the various stages of postlarval growout and become juvenile animals. In these hatchery, larval and postlarval growout tanks, located in separate controlled-environment structures, all environmental factors are rigidly and artificially controlled. Light radiation is provided by artificial systems. Finally, the shrimp are transferred to a waterway in an enclosure unit of the present invention for growout to marketable size.

The control of natural solar radiation reaching the waterway and the shrimp and algae in the waterway and the control of water flow and replacement in the waterway and finally the control of water temperature by radiational heating and evaporative cooling by the airflow into and out of the unit are used to manipulate the environmental parameters affecting shrimp productivity and growth.

While inflated shrimp environmental enclosures may vary in size a dome for covering two waterways has been found satisfactory. The maximum height of the dome above walkway 4 should be about 6 feet to permit workers to move easily through the dome for cleaning, feeding and other operations.

Food rations are introduced into the waterways as required for most economical gain of the shrimp. In addition to those artificial feeds the shrimp graze upon the growing algae in the waterway. A juvenile shrimp may consume each day food equal to approximately 10 percent of its body weight; larger animals up to 5 percent of body weight. As shrimp reach adulthood, they are ready for harvesting and market. The size and weight of shrimp considered marketable varies with the season and preference of the purchasing public.

I claim:

1. A method of feeding Penaeid shrimp in a controlled environment to bring the shrimp to marketable size comprising
 a. introducing shrimp of less than marketable size into an environmental enclosure unit comprising
   i. an elongated foundation member;
   ii. an elongated waterway connected to said foundation member, said waterway initially supplied with a quantity of water having the qualities of natural seawater, a quantity of algae, shrimp and food, said waterway having means for controllably introducing at selected times water to the waterway and means for controllably at selected times removing water from the waterway;
   iii. a walkway adjacent the waterway to provide access for workers tending the shrimp; and
   iv. a translucent flexible-material light-screening dome means positioned over and enclosing the waterway and walkway to prevent substantial communication of air between the inside of the dome means and the outside of the dome means, the light transmission capabilities of the dome means selected to control the amount of incident light and light spectral characteristics reaching the waterway during daylight hours;
 b. maintaining a substantial quantity of algae in the waterway;
 c. intermittently supplying additional quantities of such water during nighttime hours to said waterway such added water having a dissolved oxygen content different from the dissolved oxygen content of the water then in the waterway and intermittently removing at a remote point water, waste and food to maintain selected levels of water in the waterway; and
 d. providing the shrimp with additional food rations as required for growth
whereby the shrimp prosper and increase their weight to a marketable size.

2. The method of claim 1 in which the dome means is supported over the waterway by air pressure.

3. A method of cultivating Panaeid shrimp comprising
 a. generating Panaeid shrimp eggs;
 b. hatching the eggs;
 c. rearing the eggs through larval and postlarval stages;
 d. placing such juvenile shrimp in an environmental enclosure unit and holding them there for a holding period including a substantial part of a season of the year which enclosure unit comprises
   i. an elongated foundation member;
   ii. an elongated waterway connected to the foundation member, said waterway having seawater, or the like, and substantial quantities of algae therein; and having means for controllably at selected times supplying water to the waterway and means for controllably at selected times removing water from the waterway;
   iii. light-screening dome means having portions which vary in their light transmission qualities said means covering and positioned over the waterway to prevent communication of substantial amounts of air between the inside and the outside of the dome means;
 e. providing the shrimp with sufficient food rations during the holding period; and
 f. supplying during non-daylight hours additional water at controlled temperatures to increase the dissolved oxygen content of the waterway water,
such that the shrimp is subjected to seawater or its substantial equivalent, to varying water temperatures, dissolved oxygen levels and to natural light variations correlative with the seasonal and daily changes occuring during such holding period.

4. The method of claim 3 in which the waterway has plastic sheet linear means supported at its edges by detachable clip means.

5. Apparatus for feeding shrimp to increase their weight to marketable size comprising
 a. an elongated foundation member;
 b. an elongated waterway connected to to said foundation for holding natural seawater or water having the dissolved oxygen, temperature, pH, salinity and other characteristics of natural seawater and holding shrimp and algae;
 c. a walkway adjacent the waterway to provide access for workers tending the shrimp;
 d. translucent covering means supported over and enveloping the waterway and the walkway to form an enclosure in which the air temperature can be controlled; and
 e. water transport means for intermittently introducing additional water into the waterway and for removing water, waste and food from the waterway after it has traveled a substantial distance along the waterway.

6. The apparatus of claim 5 in which the covering means is a light plastic material supported by air pressure.

7. The apparatus of claim 5 having in addition means for providing water having selected temperatures and dissolved oxygen contents to the water transport means which selected temperatures and oxygen contents provide conditions in the waterway substantially proportional to conditions in nature offshore shrimp habitats at the latitudes at which the waterway is located.

8. The apparatus of claim 5 in which the waterway has a plastic liner means supported at its edges with detachable clip means.

* * * * *